3,542,701
ELEMENTARY SULFUR AS FLAME-RETARDANT
IN PLASTIC FOAMS
Gerrit W. van Raamsdonk, Delft, Netherlands, assignor to Shell Oil Company, New York, N.Y., a corporation of Delaware
No Drawing. Filed Sept. 27, 1967, Ser. No. 671,113
Claims priority, application Great Britain, Nov. 29, 1966, 53,441/66
Int. Cl. C08f 33/02, 45/00, 47/08
U.S. Cl. 260—2.5    5 Claims

ABSTRACT OF THE DISCLOSURE

Inflammability of foamed synthetic macromolecular substances is decreased by the addition of elementary sulfur under such conditions that in a layer of the cellular structure extending along the surface or part thereof and 1 mm. deep, a content of elementary sulfur of at least 2% by weight is left.

---

The invention relates to a process for the manufacture of foams and other cellular structures of decreased inflammability, consisting for a major part by weight of synthetic macromolecular substances which are combustible per se.

It is known that it is possible to decrease inflammability of foams of synthetic macromolecular substances by incorporation of organic halogen compounds, organic phosphrus compounds and antimony compounds. On the other hand polyurethane foams are known prepared from mixtures containing limited amounts of elementary sulfur, to wit quantities between 0.1 and 1% by weight, in order to prevent discoloration. Also sulfur was incorporated as a vulcanizing agent with foams of natural or synthetic rubbers; in such a case the elementary sulfur is entirely consumed by subsequent vulcanization.

It has been found now that elementary sulfur when incorported with foams and other cellular structures of synthetic macromolecular substances is very effective as a flame retarder, thus considerably decreasing inflammability.

The invention may be defined as relating to a process for the manufacture of foams and other cellular structures of decreased inflammability, consisting for a major part by weight of combustible synthetic macromolecular substances, by foaming or sintering, starting from mixtures of said synthetic macromolecular substances and/or substances (precursors) from which said synthetic macromolecular substances are obtained, with elementary sulfur, under such conditions that in a layer of the cellular structure extending along the surface or part thereof and 1 mm. deep, a content of elementary sulfur of at least 2% by weight is left.

The elementary sulfur may be mixed with the synthetic macromolecular substances after the preparation of the latter, but it is also possible to mix the elementary sulfur with precursors of the macromolecular substances. Thus the elementary sulfur may be mixed with monomers which on polymerization yield the macromolecular substances or the elementary sulfur may be mixed with substances which yield the macromolecular substances in a subsequent addition or condensation reaction. If the elementary sulfur is mixed with the synthetic macromolecular substance after the preparation thereof, it may be added before foaming or sintering procedure, or, if these procedures are carried out in two or more stages, also between two stages, a prefoamed macromolecular substances being thus mixed with sulfur and subsequently treated in a way as is conducive to further expanion or development of the foam.

It is sufficient in order to obtain flame retardation in the foam, that the flame retarding substances are present in sufficient concentration only at the surfaces of the foam which are or will be exposed to oxidative atmospheres, e.g., air. The sufficient concentration is two percent by weight and this minimum concentration must be present if and where effective flame retardation is required, as an average over a surface layer of a depth of 1 mm.

The flame retardation results from the presence of sulfur in elementary state. Therefore, it is essential that the given minimum concentration of elementary sulfur is left, that is to say is still present after completion of the foaming or sintering. Some consumption of elementary sulfur may occur as a result of chemical reactions, for instance, reactions between sulfur and macromolecular substances or their low molecular weight precursors, in particular if these substances or precursors contain double or triple bonds between carbon atoms or hydrogen attached to tertiary carbon atoms. The requirement of a minimum concentration of elementary sulfur to be left, implies that a sufficient surplus of elementary sulfur must be applied to compensate for the losses of elementary sulfur by the said reactions, if any. The magnitude of the said surplus is dependent on the specific reactivity of the hydrocarbons present, on the quantity and specific reactivity of other reactive and sulfur consuming compounds, if present, on the quantity or specific reactivity of initiators or catalysts, influencing sulfur consuming reactions, if present, and on the temperature.

Whereas the limit of 2% by weight is a minimum for achieving effective flame retardation, it is recommended to apply concentrations of elementary sulfur in the above described surface layer of the cellular structure between 5 and 35% by weight. Suitable concentrations may be selected in accordance with the reactivity of the particular macromolecular substance and the cellular structure under consideration with oxygen and in accordance with the required effect.

Whereas it is sufficient to have the sulfur present only at surfaces of the cellular structure which are contacted with oxidative atmospheres, the sulfur in most cases will for convenience be more or less evenly distributed through the cellular structure. This implies that the elementary sulfur is more or less evenly distributed also in the mixtures in which the foam or other cellular structure is generated or in the mixtures or prefoamed synthetic macromolecular material and sulfur which are sintered or further expanded.

The total amount of elementary sulfur in the foam or other cellular structure may be as high as slightly under 50% by weight.

In many cases undesirable reactions of the sulfur with organic compounds, which are present in the mixture from which the foam or other cellular structure is to be prepared, may be largely avoided by limitation of the temperature. Usually the temperature during preparation of the cellular structure is kept below 250° C. In some cases, viz. with polystyrene, the preparation of the cellular structure is preferably carried out at temperatures below the melting point of the sulfur.

The invention is applicable to all foams or other cellular or porous structures of combustible synthetic macromolecular substances, without exceptions, although the best results are obtained with substances, which at the temperatures, applied in the preparation of the foams or other cellular or porous structures of these substances, hardly react with sulfur if at all. Thus, among polymers of hydrocarbons those of monoolefinically unsaturated hydrocarbons are preferred.

Technically most important among foams or cellular structures known at present are those of polystyrene and those of the polyurethanes. The invention is also important, however, in the preparation of foams and other cellular or porous structures of polyolefins, polyesters, polyethers and polyacetals.

When making use of the invention every known process for the preparation of foams or other cellular or porous structures of macromolecular substances can be followed.

If the foaming process starts from a macromolecular substance which has been prepared before, use is made of a blowing agent which usually is a physical blowing agent, that is an organic, volatile liquid, compatible with the macromolecular substance. Hydrocarbons such as pentane, and organic halogen compounds, such as trichlorofluoromethane and other so-called "Freons" are generally used. Also so-called chemical blowing agents may be applied, i.e., substances which as a result of a chemical reaction produce a gas. Examples of such chemical blowing agents are azo and diazo compounds which on heating yield nitrogen, and mixtures of carbonates or bicarbonates with solid acids, e.g., citric acid, which on heating yield carbon dioxide. Often a physical blowing agent is used simultaneously with a chemical blowing agent, in which case the latter acts as a nucleating agent which promotes the evenness of distribution of the foam cells.

The foaming can be carried out by extrusion of a mixture of the macromolecular substance with an appropriate amount of blowing agent, from appropriate known apparatus, in which the mixture is under pressure, through narrow apertures, into the atmosphere. Thus rods or strands are extruded from circular orifices, whereas for the manufacture of slabs use is made of extrusion through slits or the blowing of balloons which are subsequently flattened. Another known technique is injection molding in which the foam is generated during injection of the mixture into molds. Molds may also be partly filled with mixtures of macromolecular substance and a blowing agent, after which the mold is closed and heat is provided to cause the mixture to expand so as to take the shape of the mold. For convenience the mixture in this case may consist of beads (e.g., styrene beads) which have been prepared previously and are kept in storage. The beads may contain an appropriate amount of blowing agent. They also may have been pre-expanded in a preliminary foaming step before being stored, in order to facilitate post-expansion in the mold. A cellular or porous structure is obtained by sintering grains or beads of macromolecular substances so as to cause them to adhere to each other. A mixture of a macromolecular substance with a blowing agent, preferably in the shape of beads may also be put into molds open at one side, the expansion at that side not being hampered.

A very satisfactory way of preparation of a polystyrene foam of decreased inflammability in accordance with the invention is mixing polystyrene beads with sulfur and expanding the mixture as is customary with the polystyrene beads per se. Preferably the sulfur is mixed with pre-expanded beads the mixture being subsequently further expanded. The mixtures of polystyrene beads, which may be pre-expanded or not, with sulfur may be stored to be used as need demands.

The preparation of the macromolecular substance and its foaming may occur simultaneously. The heat developed in the polymerization, poly-addition or polycondensation reaction may then cause a foaming agent to evaporate thus generating foam. In this way polyurethanes are formed by reaction of polyisocyanates and polyhydroxy compounds, usually polyvalent alcohols. Instead of polyvalent alcohols also polyphenols, polycarboxylic acids and polyamines may be reacted with polyisocyanates. Blowing agents for the foaming of the polyurethanes are for instance organic fluorine compounds and water. Water reacts with the isocyanate groups converting them into amino groups under development of carbon dioxide. The amino groups further take part in the formation of macromolecules by reaction with remaining isocyanate groups.

In the preparation of macromolecular compounds as described above the sulfur may be introduced together with the precursors which on reaction yield the macromolecular compounds. When polyurethane foams are prepared the sulfur is advantageously suspended in the polyhydroxy compound used in this process, before this compound is mixed with a polyisocyanate.

Often a polyurethane foam is made in a mold, which during the generation of the foam may be closed or open, by introducing therein the components taking part in the reaction. The components may be introduced as a fluid mixture or a fluid mixture may be obtained on mixing in the mold. In the fluid mixture sulfur may be present in suspension. Soon after mixing the components, the reaction and the foaming start.

If in the meantime, the suspended sulfur particles are allowed to settle or to concentrate near the bottom of the mold the property of non-inflammability may be restricted to the surface of the generated foam body which is adjacent to the bottom of the mold. If only this surface of the foam body is intended to be contacted with oxidation atmospheres, the result may be quite satisfactory. Often, however, it will be preferred to keep the sulfur more or less evenly distributed through the reacting mixture. To this end during reaction and foaming the mixture may be shaken, stirred or kneaded according as the viscosity of the mixture requires.

Conventional additives such as plasticizers, fillers, stabilizers, colorants and pigments may be incorporated in the foams which are manufactured in accordance with the invention. These other additives may be added together with the sulfur or separately in various stages. The sulfur may be dispersed for instance in a plasticizer before its addition. The sulfur may also be mixed with an inert filler before addition; thus the sulfur for instance may be adsorbed on a porous inert material, such as clay, china clay, bentonite or kieselguhr. As fine comminution of the sulfur before addition to the macromolecular substances or their precursors, favors the flame retarding effect, also the repartition of the sulfur on the surface of filler particles adds to the effect.

In some cases the sulfur may be used advantageously as a solution in appropriate solvents, such as carbon disulfide or naphthalene.

The sulfur particles may be coated before use in order to avoid clustering and to avoid chemical reaction with organic compounds. Substances suitable for use as coatings are starch, polyvinyl alcohol and polyvinyl acetate. Sulfur may be mixed with solutions, suspensions or latices of such compounds to make a slurry, which may be applied for instance on polystyrene particles or beads. Also it is possible to use polystyrene as a coating. To this end sulfur is mixed with molten polystyrene and the mixture is solidified and ground. The ground mixture is added to the macromolecular substances or their precursors, from which a cellular structure is to be prepared.

The sulfur may be used as a flame retarding agent together with other substances which diminish inflammability of cellular structures of macromolecular compounds. Such substances may be organic halogen compounds and/or organic phosphorus compounds which are not too volatile, so that a substantial part thereof does not evaporate during the foaming or sintering procedure. Examples are tris(2,3-dibromopropyl)phosphate and trichloroethyl phosphate. Also for instance antimony compounds may be added. As sulfur is active mainly at low ignition temperatures it may be favorably combined with flame retarding agents which are active mainly at higher temperatures.

EXAMPLES

The inflammability of foams was tested as follows, in accordance with standard method ASTM D1692–59T. A number of samples measuring 6" x 2" x ½" were cut from a foam with a band saw. All surfaces were blown free from dust. Each sample was marked with two lines (gauge marks), 1" and 5". respectively, from one end of the sample. A steel gauze of ¼" mesh was clamped horizontally in a retort stand and the height was so adjusted that the gauze was ½" above the top of a Bunsen burner. The Bunsen flame was adjusted to give a flame height of 1½". A test sample was then placed on the gauze with one end of the sample at one end of the gauze. The burner was then placed centrally under this end of the sample. The flame was kept in position for one minute or until the flame front reached the first gauge mark. The burner was then removed and a stop-watch was started.

If the flame continues to burn up to the second gauge mark, the time taken to reach the second mark is noted in seconds ($t$) and the sample is adjudged to be "burning." The burning rate is calculated as $240/t$ inch/minute.

If the flame does not continue to burn up to the second gauge mark, the time taken for the flame to be extinguished is noted and also the distance from the first gauge mark which has been burned. This is calculated by 4" minus unburned portion. The sample in this case is judged to be "self-extinguishing."

If the flames does not reach the first gauge mark after 1 minute or is extinguished as soon as the burner is removed, the sample is judged to be "nonburning."

EXAMPLE I

Starting from pre-expanded polystyrene beads the density of which was 150 grams/liter, samples measuring 6" x 2" x ½" were made by post-expansion in molds. By variation of the quantity of styrene used samples were obtained of different densities.

The procedure was repeated but this time the polystyrene beads before pre-expansion were mixed with varied amounts of a slurry containing 5% by weight of sulfur, 10% by weight of starch and 85% by weight of water.

The samples were tested as described above. The average results of 4 tests have been collected in the following table. The tests with 0 and 1% sulfur are not in accordance with the invention but for comparison only.

| Density after post-expansion, grams/liter | 24 | | | | 47 | | | | 69 | | | |
|---|---|---|---|---|---|---|---|---|---|---|---|---|
| Percent S | 0 | 1 | 5 | 10 | 20 | 0 | 1 | 5 | 10 | 0 | 1 | 5 | 10 |
| $t$, seconds | 29 | 86 | 41 | 8.5 | 23 | 38 | 73 | 34 | 20 | 57 | 98 | 74 | 83 |
| Burnt length, cm | 10 | 8.1 | 4.9 | 1 | 4.6 | 10 | 6.6 | 3.2 | 1.9 | 10 | 9.5 | 6 | 7.5 |

From the results it is evident that whereas styrene with sulfur is "burning," the admixture of sulfur makes it "self-extinguishing." The efficacy of sulfur addition is dependent upon the density of the sample and the sulfur content. The efficacy of sulfur addition for lower densities is better than for higher densities. For every density an optimal sulfur content can be found. For a density of 24 g./l. this optimum is between 10 and 20% S, for a density of 69 g./l. the optimum is between 1 and 10% S.

EXAMPLE II

Samples of polystyrene of a density of 24 grams/liter were made as described in Example I. Some samples contained 3% by weight of sulfur, other samples contained 3% by weight of sulfur and 2% by weight of tris(2,3-dibromopropyl)phosphate (TDBPP). Blanks were made either without addition or with 2% by weight of TDBPP only.

| | No addition | 3% S | 3% S 2% TDBPP | 2% TDBPP |
|---|---|---|---|---|
| $t$, second | 29 | 65 | 1.8 | 22 |
| Burnt length, cm | 10 | 6.5 | 0.5 | 3.9 |
| Qualification | Burning | Self-extinguishing. | Self-extinguishing. | Self-extinguishing. |

It is seen that the combination of sulfur and TDBPP is very efficacious.

EXAMPLE III

In this example the invention was applied to polyurethane foams prepared from 170 parts by weight of diphenylmethane-4,4'-diisocyanate "Caradate 30" and 105 parts by weight of the mixture known as "RD 270" using trichlorofluoromethane as a blowing agent. The mixture "RD 270" is composed from:

| | Parts by weight |
|---|---|
| "Caradol 520" | 100 |
| Triethylamine | 2 |
| Water | 2 |
| Silicon "DC 193" | 1 |

"Caradol 520" is a condensation product of a mixture of 3 parts by weight of glycerol and 1 part by weight of sucrose with propylene oxide; this product is a quadruple functional polyol of a molecular weight of 435.

Foam samples were made in open molds. Sulfur was suspended in the polyol mixture before mixing with the diisocyanate. The density of the foam was 36 grams/liter. The samples were tested as described above.

| Trichlorofluoromethane, parts by weight | Sulfur, parts by weight | $t$, seconds | Burnt length, inch |
|---|---|---|---|
| 20 | 40 | 28 | 3.5 |
| 25 | 70 | 22 | 3.2 |

Both samples were self-extinguishing.

I claim as my invention:

1. A process for the manufacture of polystyrene foams of decreased inflammability which comprises incorporating from 5 to 35% by weight of elemental sulfur in a polystyrene bead precursor mix and expanding the mix to form a foam.

2. A process according to claim 1 wherein the foam contains one or more non-volatile organic compounds selected from the group consisting of tris(2,3-dibromopropyl)phosphate and trichloroethyl phosphate.

3. A process according to claim 1 wherein the mix is expanded in a mold.

4. A composition having decreased inflammability prepared by the process of claim 1.

5. A composition having decreased inflammability prepared by the process of claim 2.

References Cited

UNITED STATES PATENTS

| 3,132,169 | 5/1964 | Birum et al. | 260—461 |
| 3,239,483 | 3/1966 | Higgins | 260—45.8 |
| 3,317,440 | 5/1967 | Wei et al. | 260—5 |

DONALD E. CZAJA, Primary Examiner

H. S. COCKERAM, Assistant Examiner

U.S. Cl. X.R.

260—41, 45.7, 75, 77.5, 93.1